(12) United States Patent
van der Merwe et al.

(10) Patent No.: US 8,099,993 B2
(45) Date of Patent: Jan. 24, 2012

(54) METHOD AND APPARATUS FOR VERIFYING THE OPERATION OF AN ACCELEROMETER

(75) Inventors: Gert J. van der Merwe, Monroe, OH (US); David Allen Bradford, Harrison, OH (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 11/961,466

(22) Filed: Dec. 20, 2007

(65) Prior Publication Data
US 2009/0158845 A1   Jun. 25, 2009

(51) Int. Cl.
*G01P 21/00* (2006.01)
(52) U.S. Cl. ........................... 73/1.37; 73/462
(58) Field of Classification Search .................... 73/1.37, 73/462, 1.38, 66
See application file for complete search history.

(56) References Cited

U.S. PATENT DOCUMENTS

| | | | | |
|---|---|---|---|---|
| 4,037,465 | A * | 7/1977 | Cook et al. ........................ | 73/588 |
| 4,254,660 | A * | 3/1981 | Prause ............................. | 73/597 |
| 4,426,641 | A | 1/1984 | Kurihara et al. | |
| 4,485,678 | A | 12/1984 | Fanuele | |
| 4,502,330 | A * | 3/1985 | Haesen ............................ | 73/623 |
| 4,620,446 | A * | 11/1986 | Jensen et al. .................... | 73/652 |
| 5,277,063 | A | 1/1994 | Thomas | |
| 5,347,884 | A | 9/1994 | Garnjost et al. | |
| 5,629,485 | A * | 5/1997 | Rose et al. ....................... | 73/599 |
| 5,934,610 | A | 8/1999 | Karolys et al. | |
| 6,289,735 | B1 | 9/2001 | Dister et al. | |
| 6,308,554 | B1 | 10/2001 | Mattes et al. | |
| 6,498,501 | B2 | 12/2002 | Broillet | |
| 6,568,270 | B2 * | 5/2003 | Hongerholt ..................... | 73/596 |
| 6,768,938 | B2 | 7/2004 | McBrien et al. | |
| 7,013,210 | B2 | 3/2006 | McBrien et al. | |
| 7,348,771 | B2 * | 3/2008 | Goldfine et al. ............... | 324/240 |
| 7,483,774 | B2 * | 1/2009 | Grichnik et al. ................ | 701/29 |
| 7,487,134 | B2 * | 2/2009 | Grichnik et al. ................ | 706/60 |
| 7,499,842 | B2 * | 3/2009 | Grichnik et al. ................. | 703/2 |
| 7,505,949 | B2 * | 3/2009 | Grichnik ........................ | 706/44 |
| 7,542,879 | B2 * | 6/2009 | Grichnik et al. .............. | 702/189 |
| 7,565,333 | B2 * | 7/2009 | Grichnik et al. ................ | 706/12 |
| 7,584,166 | B2 * | 9/2009 | Grichnik ........................ | 706/62 |
| 7,593,804 | B2 * | 9/2009 | Grichnik et al. .............. | 701/101 |

(Continued)

FOREIGN PATENT DOCUMENTS

EP        0523732 A2    1/1993

(Continued)

OTHER PUBLICATIONS

Translation of JP 05099950 A, "Dynamics Quantity Detector", Hiroaki Obayashi, Apr. 23, 1993.*

(Continued)

*Primary Examiner* — Hezron E Williams
*Assistant Examiner* — Samir M Shah
(74) *Attorney, Agent, or Firm* — David J. Clement, Esq.; Armstrong Teasdale LLP

(57) ABSTRACT

A method of verifying the operation of an accelerometer is provided. The method includes channeling a high frequency signal through a positive lead of the accelerometer, and detecting a signal at a negative lead of the accelerometer. If the detected signal is substantially similar to the high frequency signal channeled through the positive lead, the integrity of the accelerometer is verified.

20 Claims, 2 Drawing Sheets

U.S. PATENT DOCUMENTS

| | | | |
|---|---|---|---|
| 7,787,969 B2 * | 8/2010 | Grichnik et al. | 700/48 |
| 7,788,070 B2 * | 8/2010 | Grichnik et al. | 703/1 |
| 7,831,416 B2 * | 11/2010 | Grichnik et al. | 703/1 |
| 2007/0255522 A1 * | 11/2007 | Gordon et al. | 702/150 |
| 2008/0154811 A1 * | 6/2008 | Grichnik et al. | 706/13 |

FOREIGN PATENT DOCUMENTS

| | | |
|---|---|---|
| GB | 1369435 | 10/1974 |
| JP | 05099950 A | 10/1991 |
| JP | 05099950 A * | 4/1993 |
| WO | 9506529 | 3/1995 |
| WO | 2005077029 A2 | 8/2005 |

OTHER PUBLICATIONS

IPO Search Report for application GB0822501.3 dated Mar. 9, 2009.

* cited by examiner

METHOD AND APPARATUS FOR VERIFYING THE OPERATION OF AN ACCELEROMETER

BACKGROUND OF THE INVENTION

The field of the present invention relates generally to accelerometers, and more specifically, to methods for use in verifying the operation of an accelerometer used with a turbine engine.

Known commercial engines utilize accelerometers to detect rotor unbalance within the engine. Often, it may be difficult to detect whether an accelerometer is functioning correctly due to a broadband output of the accelerometer. Accordingly, a technician may not be able to determine whether an accelerometer and/or an accelerometer harness is fully functional, is functioning intermittently, or is completely non-functional. As a result, functional accelerometers may be inadvertently replaced. However, replacing the accelerometer and/or the accelerometer harness may not address a problem with the engine.

Known methods for determining the functionality of an accelerometer generally rely on checking for a 1/rev tone emergence in the accelerometer spectrum. However, sufficient rotational speed is required to generate a vibration that will adequately show up in the spectrum. In addition, a well-balanced engine may have very low tone emergence, which may increase the difficulty in verifying the integrity of the accelerometer. Moreover, known methods require engine rotation and rotor unbalance to excite the accelerometer. As such, the integrity of the accelerometer cannot be verified prior to an engine start sequence.

BRIEF DESCRIPTION OF THE INVENTION

In one aspect, a method of verifying the operation of an accelerometer is provided. The method includes channeling a high frequency signal through a positive lead of the accelerometer, and detecting a signal at a negative lead of the accelerometer. If the detected signal is substantially similar to the high frequency signal channeled through the positive lead, the integrity of the accelerometer is verified.

In another aspect, a charge converter for verifying the operation of an accelerometer is provided. The converter includes a signal source for generating a high frequency signal. The converter also includes an output for channeling the high frequency signal through a positive lead of the accelerometer, and an input for detecting a signal at a negative lead of the accelerometer. If the detected signal is substantially similar to the high frequency signal channeled through the positive lead, the integrity of the accelerometer is verified.

In yet another aspect, a turbine engine is provided that includes a rotor, an accelerometer that monitors an unbalance of the rotor, and a charge converter that verifies the operation of the accelerometer. The charge converter verifies the integrity of the accelerometer by channeling a high frequency signal through the accelerometer, and detecting a signal discharged from the accelerometer. If the detected signal is substantially similar to the high frequency signal channeled through the positive lead, the integrity of an accelerometer signal chain is verified.

DETAILED DESCRIPTION OF THE INVENTION

A charge converter is provided that may be used to verify the operation of an accelerometer. The converter includes a signal source that generates a high frequency signal that is channeled through an accelerometer. If a signal detected at a negative lead of the accelerometer is substantially similar to the high frequency signal, the integrity of the accelerometer is verified. The converter distinguishes intermittent faults in the accelerometer from continuous faults in the accelerometer by continuously channeling the high frequency signal through the accelerometer. In the exemplary embodiment, the converter verifies the operation of an accelerometer that monitors a rotor unbalance of a turbine engine, and as such the converter must channel a signal that has a frequency that is different from an operating frequency of the turbine engine. Moreover, in the exemplary embodiment, the converter channels the high frequency signal through the accelerometer prior to operating the turbine engine.

It should be noted that although the present invention is described with respect to turbine engines, one of ordinary skill in the art should understand that the present invention is not limited to being used only with turbine engines. Rather, the present invention may be used with any system that is monitored by an accelerometer. Further, the present invention is described herein only with respect to verifying the operation of an accelerometer. However, as would be appreciated by one of ordinary skill in the art, the present invention is used to verify the operation of the accelerometer, an accelerometer harness, and/or a signal chain of the accelerometer. Moreover, as would be appreciated by one of ordinary skill in the art, the present invention may be used to verify the operation of any device.

Figure 1:
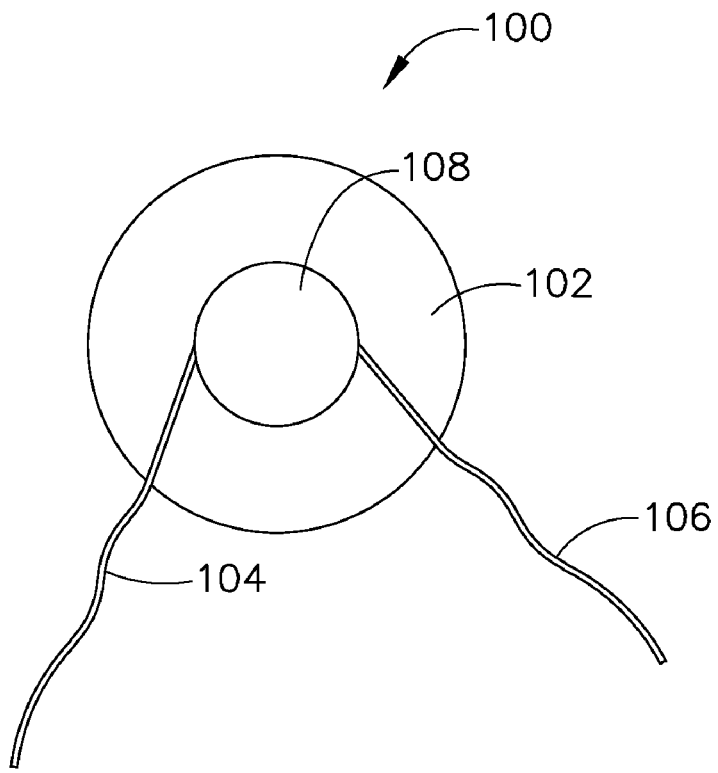
FIG. 1 is a schematic view of an exemplary accelerometer that may be used with a turbine engine.

FIG. 1 is a schematic illustration of an exemplary accelerometer 100 that may be used with a turbine engine (not shown). In the exemplary embodiment, accelerometer 100 includes a measuring device 102, a positive lead 104, and a negative lead 106. Measuring device 102 includes a piezo element 108 that is electrically coupled to positive lead 104 and negative lead 106. Accelerometer 100 is positionable within the turbine engine to detect rotor unbalances within the engine. Specifically, in the exemplary embodiment, measuring device 102 is coupled to a rotor (not shown) of the turbine engine to enable piezo element 108 to detect rotor imbalances.

During operation, an electrical signal is channeled to piezo element 108. Accelerometer 100 determines the balance of the rotor, based on the electrical signal, and channels a resultant broadband signal through positive lead 104 and negative lead 106. A spectrum of the resultant broadband signal is indicative of the rotor's balance and, such a spectrum is therefore, monitored to detect rotor imbalances.

Figure 2:
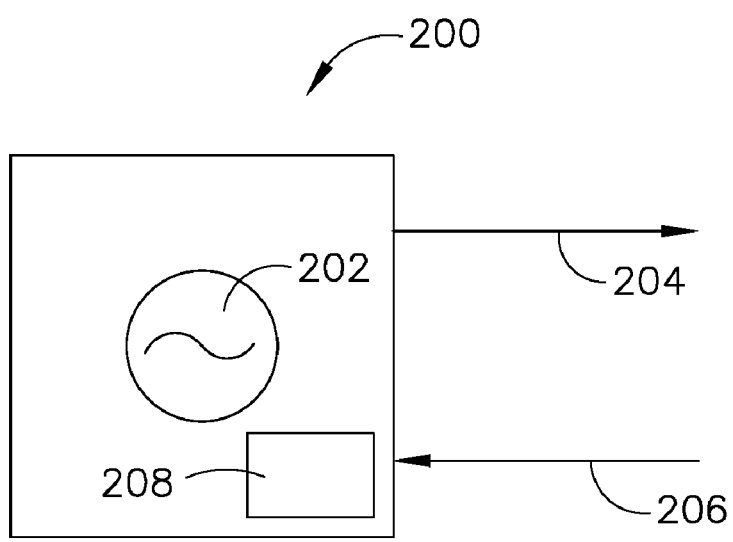
FIG. 2 is a schematic view of an exemplary charge converter that may be used to verify the operation of the accelerometer shown in FIG. 1.

FIG. 2 is a schematic illustration of an exemplary charge converter 200 that may be used to verify the operation of an accelerometer, such as accelerometer 100 (shown in FIG. 1). In the exemplary embodiment, charge converter 200 includes a signal source 202, an output 204, an input 206, and a monitoring device 208. Output 204 is configured to electrically couple to accelerometer positive lead 104, and input 206 is configured to electrically couple to accelerometer negative lead 106. In the exemplary embodiment, monitoring device 208 is electronically coupled to input 206. During use, signal source 202 channels a high frequency signal from output 204 through accelerometer 100 and through input 206 to verify the integrity of accelerometer 100 at monitoring device 208, as described in more detail below.

Figure 3:
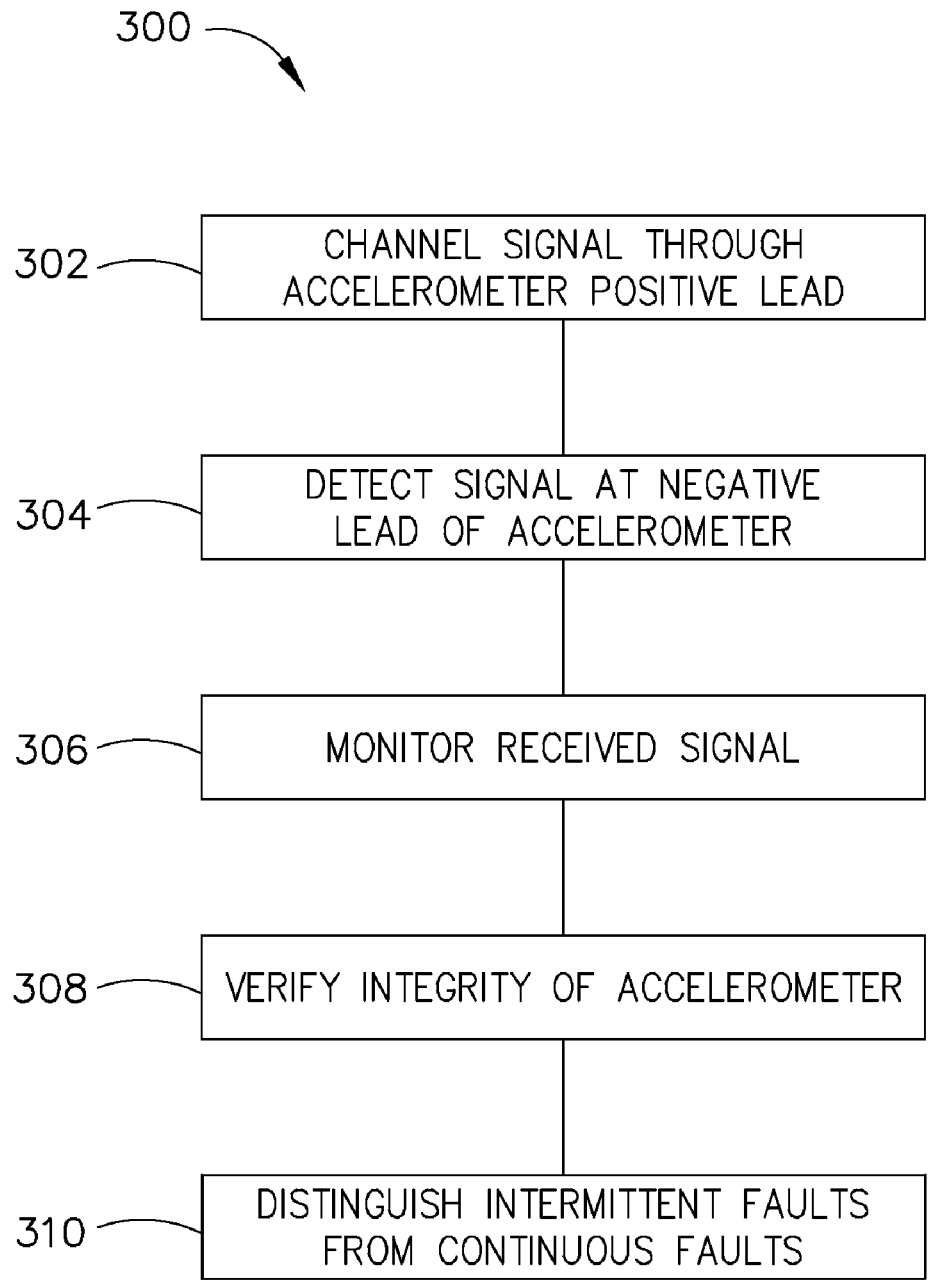
FIG. 3 is a flowchart illustrating an exemplary method for verifying the integrity of the accelerometer shown in FIG. 1 while using the charge converter shown in FIG. 2.

FIG. 3 is a flowchart of an exemplary method 300 for verifying the operation of an accelerometer, such as accelerometer 100 (shown in FIG. 1) using a charge converter, such as charge converter 200 (shown in FIG. 2). In the exemplary embodiment, charge converter 200 channels 302 a signal, having a known frequency, through accelerometer positive lead 104. Specifically, the signal is channeled from output 204 (shown in FIG. 2) to positive lead 104. In the exemplary embodiment, the signal has a high frequency. Alternatively, the signal may have any frequency that differs from the operating frequencies of the turbine engine (not shown) and that enables charge converter 200 to function as described herein.

In the exemplary embodiment, the signal is channeled through piezo element 108 (shown in FIG. 1) prior to being channeled to monitoring device 208 (shown in FIG. 2). Specifically, in the exemplary embodiment, the signal is channeled via negative lead 106 (shown in FIG. 1) and input 206 (shown in FIG. 2) to monitoring device 208. Accordingly, the signal received at monitoring device 208 is detected 304 and monitored 306. By monitoring 306 the signal, monitoring device 208 can verify that accelerometer 100 is functioning properly. Specifically, if the signal detected 304 at negative lead 106 is substantially similar to the signal channeled into positive lead 104; the operation of accelerometer 100 is verified. By continuously monitoring 306 for a signal, monitoring device 208 can accurately determine 308 if there is problem with accelerometer 100. More specifically, monitoring device 208 is able to distinguish 310 intermittent faults in accelerometer 100 from continuous faults in accelerometer 100. In addition, because method 300 does not require engine rotation and/or rotor unbalance to excite accelerometer 100, the integrity of accelerometer 100 can be verified prior to operation of the turbine engine.

In one embodiment, a method of verifying the operation of an accelerometer is provided. The method includes channeling a high frequency signal through a positive lead of the accelerometer, and detecting a signal at a negative lead of the accelerometer. If the detected signal is substantially similar to the high frequency signal, the integrity of the accelerometer is verified. In one embodiment, the high frequency signal is channeled through a piezo element of the accelerometer. In one embodiment, the method also enables intermittent faults in the accelerometer to be distinguished from continuous faults in the accelerometer. In another embodiment, the method includes continuously channeling a high frequency signal through the positive lead of the accelerometer. In yet another embodiment, the method includes channeling a signal having a frequency that is different from an operating frequency of a machine monitored by the accelerometer. In one embodiment, the high frequency signal is channeled through the accelerometer prior to the machine being operated. In the exemplary embodiment, the method also includes verifying the operation of an accelerometer that monitors a rotor unbalance of a turbine engine.

The above-described apparatus and methods facilitate verifying the operation of an accelerometer that is used to monitor rotor unbalances within a turbine engine. Specifically, the above-described apparatus and methods enable intermittent faults in the accelerometer to be accurately distinguished from continuous faults in the accelerometer. Further, the above-described apparatus and methods facilitate verifying the integrity of the accelerometer prior to start up operations of the turbine engine. Accordingly, time and/or costs associated with testing, maintaining, and replacing accelerometers are facilitated to be reduced.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for verifying the operation of an accelerometer are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, it will be recognized that the invention can be practiced with modification within the spirit and scope of the claims.

What is claimed is:

1. A method of verifying the operation of an accelerometer that includes a piezo element, said method comprising:
channeling a high frequency signal from an output of a signal source to the piezo element through a positive lead that is electrically coupled to the piezo element; and
at an input of a monitoring device, detecting a signal from a negative lead that is electrically coupled to the piezo element, wherein, if the detected signal from the negative lead is substantially similar to the high frequency signal channeled through the positive lead, the integrity of the accelerometer is verified.

2. A method in accordance with claim 1, further comprising channeling the high frequency signal through the piezo element.

3. A method in accordance with claim 1, further comprising distinguishing intermittent faults in the accelerometer from continuous faults in the accelerometer.

4. A method in accordance with claim 1, wherein channeling a high frequency signal through a positive lead further comprises continuously channeling a high frequency signal through the positive lead.

5. A method in accordance with claim 1, wherein channeling a high frequency signal through a positive lead further comprises channeling a signal having a frequency that is different from an operating frequency of a machine that the accelerometer monitors.

6. A method in accordance with claim 1, further comprising channeling the high frequency signal through the accelerometer prior to operating a machine monitored by the accelerometer.

7. A method in accordance with claim 1, further comprising verifying the operation of an accelerometer used to detect rotor imbalances in a turbine engine.

8. A charger converter for use in verifying the operation of an accelerometer that includes a piezo element, said converter comprising:
a signal source for generating a high frequency signal;
an output for channeling the high frequency signal from the signal source to the piezo element through a positive lead that is electrically coupled to the piezo element; and
an input for detecting a signal at a negative lead that is electrically coupled to the piezo element, wherein, if the detected signal is substantially similar to the high frequency signal channeled through the positive lead, the integrity of the accelerometer is verified.

9. A converter in accordance with claim 8, wherein said output channels the high frequency signal through the piezo element.

10. A converter in accordance with claim 8, wherein said input distinguishes intermittent faults in the accelerometer from continuous faults in the accelerometer.

11. A converter in accordance with claim 8, wherein said output continuously channels the high frequency signal through the positive lead.

12. A converter in accordance with claim 8, wherein said output channels a signal having a frequency that is different from an operating frequency of a machine that the accelerometer monitors.

13. A converter in accordance with claim 8, wherein said output channels the high frequency signal through the accelerometer prior to operating a machine monitored by the accelerometer.

14. A converter in accordance with claim 8, wherein said converter verifies the operation of an accelerometer used to detect rotor imbalances in a turbine engine.

15. A turbine engine comprising:
a rotor;
an accelerometer that monitors an unbalance of said rotor, said accelerometer comprising a piezo element; and
a charge converter that verifies the operation of said accelerometer by:
channeling a high frequency signal to the piezo element through a positive lead that is electrically coupled to the piezo element; and
detecting a signal discharged from said accelerometer via a negative lead that is electrically coupled to the piezo element, wherein, if the detected signal is substantially similar to the high frequency signal channeled through the positive lead, the integrity of an accelerometer signal chain is verified.

16. A turbine engine in accordance with claim 15, wherein said charge converter further verifies the integrity of said accelerometer by channeling the high frequency signal through the piezo element.

17. A turbine engine in accordance with claim 15, wherein said charge converter further verifies the integrity of said accelerometer by distinguishing intermittent faults in said accelerometer from continuous faults in said accelerometer.

18. A turbine engine in accordance with claim 15, wherein said charge converter further verifies the integrity of said accelerometer by continuously channeling a high frequency signal through said accelerometer.

19. A turbine engine in accordance with claim 15, wherein said charge converter further verifies the integrity of said accelerometer by channeling a signal having a frequency that is different from an operating frequency of said rotor.

20. A turbine engine in accordance with claim 15, wherein said charge converter further verifies the integrity of said accelerometer by channeling the high frequency signal through said accelerometer prior to operating said rotor.

* * * * *